US 8,317,901 B2

(12) United States Patent
Kruglick (10) Patent No.: US 8,317,901 B2
(45) Date of Patent: Nov. 27, 2012

(54) NANOPARTICLE FILTRATION (75) Inventor: Ezekiel Kruglick, Poway, CA (US)

(73) Assignee: Empire Technology Development LLC, Wilmington, DE (US)

( * ) Notice: Subject to any disclaimer, the term of this patent is extended or adjusted under 35 U.S.C. 154(b) by 472 days.

(21) Appl. No.: 12/714,078

(22) Filed: Feb. 26, 2010

(65) Prior Publication Data
US 2011/0209611 A1    Sep. 1, 2011

(51) Int. Cl.
*B03C 3/16* (2006.01)
(52) U.S. Cl. ............ 95/64; 95/2; 95/71; 95/78; 95/196; 95/219; 96/18; 96/27; 96/52; 96/61; 96/74; 96/244; 96/306; 96/360; 261/3; 261/81; 261/DIG. 48
(58) Field of Classification Search ............... 261/3, 81, 261/DIG. 48; 95/2, 63, 64, 71, 78, 188, 189, 95/195, 196, 205, 206, 219; 96/18, 27, 52, 96/53, 61, 74, 244, 306, 360; 60/275, 311
See application file for complete search history.

(56) References Cited

U.S. PATENT DOCUMENTS

| 3,155,472 | A | * | 11/1964 | Huppke ........................ 96/179 |
| 4,141,698 | A | * | 2/1979 | Kihlstedt et al. .................. 95/69 |
| 4,734,109 | A | * | 3/1988 | Cox ................................ 95/189 |
| 5,030,253 | A | * | 7/1991 | Tokuhiro et al. ............... 95/216 |
| 5,665,277 | A | | 9/1997 | Johnson |
| 5,792,241 | A | * | 8/1998 | Browitt ........................... 96/52 |
| 5,968,231 | A | | 10/1999 | Parmentier et al. |
| 6,105,941 | A | | 8/2000 | Buchanan et al. |
| 6,235,088 | B1 | * | 5/2001 | Matsuura ......................... 96/53 |
| 6,355,178 | B1 | * | 3/2002 | Couture et al. ........... 210/748.05 |
| 6,709,490 | B1 | | 3/2004 | Calderon De Los Santos |
| 6,969,420 | B2 | | 11/2005 | Chien |
| 7,347,889 | B2 | * | 3/2008 | Matsuura et al. ............... 96/389 |
| 7,393,385 | B1 | * | 7/2008 | Coffey et al. ..................... 95/59 |
| 2005/0223890 | A1 | * | 10/2005 | Matsuura ........................ 95/29 |

FOREIGN PATENT DOCUMENTS

| JP | 55-127215 A | * | 10/1980 | .................... 261/81 |
| JP | 3207419 A | | 9/1991 | |
| JP | 2001-248420 A | | 9/2001 | |
| WO | PCT/US2010/046696 | | 10/2010 | |

OTHER PUBLICATIONS

Dyson, Root Cyclone Technology; Internet article; 2 pages.
Tri-Mer Corporation, Fine Particulate and Gas Removal; Product Bulletin; 4 pages.
Zhang, Stability of commercial metal oxide nanoparticles in water; Article, Water Research 42 (2008), 9 pages.

(Continued)

*Primary Examiner* — Richard L Chiesa
(74) *Attorney, Agent, or Firm* — Jensen & Puntigam, PS (57) ABSTRACT

The present disclosure generally relates to cyclonic separation or filtering of nanoparticles suspended in a gas. A plume of liquid droplets may be generated using an ultrasound or other generator. The gas may be mixed with the plume of liquid droplets, which may have received an electrostatic charge prior to mixing, to promote preferential adhesion of the nanoparticles to the liquid droplets. The gas with suspended nanoparticles and suspended liquid particles may flow through a cyclonic separator that spins rapidly, causing the cleaned gas to flow out of the filter while the liquid with adhered nanoparticles may be discharged, collected, and/or re-used in the plume generator. By causing nanoparticles to adhere to larger liquid particles, the filter may allow the filtering and collection of much smaller particles than current systems may filter under atmospheric pressure.

25 Claims, 6 Drawing Sheets

OTHER PUBLICATIONS

Burtscher, Physical characterization of particulate emissions from diesel engines; a review; Article, Aerosol Science 36 (2005); 37 pages.

Oberdorster, G., et al., "Toxicology of Nanoparticles: A Historical Perspective," Nanotoxicology vol. 1, Issue 1, pp. 2-25, 2007.

Buzea, C., et al., "Nanomaterials and Nanoparticles: Sources and Toxicity," Biointephases, vol. 2, Issue 4, pp. MR17—MR 172, 2007.

* cited by examiner

NANOPARTICLE FILTRATION

BACKGROUND

Unless otherwise indicated herein, the materials described in this section are not prior art to the claims in this application and are not admitted to be prior art by inclusion in this section.

Nanoparticles have a relatively large surface area and small volume, causing them to have different properties and different effects than larger materials with the same chemical composition. This high surface-to-volume ratio may make nanoparticles more chemically reactive and more bioactive, potentially leading to medical and/or environmental harm.

Nanoparticles arise in the environment from several sources. Engineered nanoparticles are used in a variety of technologies and consumer products such as cosmetics, sunscreens, textiles, coatings, food and energy technologies, and medical products and medicines. Nanoparticles also arise as byproducts of various systems, for example, from vehicular combustion, particularly by large vehicles with diesel engines.

BRIEF DESCRIPTION OF THE DRAWINGS

The foregoing and other features of the present disclosure will become more fully apparent from the following description and appended claims, taken in conjunction with the accompanying drawings. Understanding that these drawings depict only several embodiments in accordance with the disclosure and are, therefore, not to be considered limiting of its scope, the disclosure will be described with additional specificity and detail through use of the accompanying drawings, in which:

DETAILED DESCRIPTION

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented here. It will be readily understood that the aspects of the present disclosure, as generally described herein, and illustrated in the Figures, may be arranged, substituted, combined, and designed in a wide variety of different configurations, all of which are explicitly contemplated and made part of this disclosure.

While nanoparticles have many new uses and beneficial applications, they also have potential to create new health risks. For example, while humans and organisms have developed biological mechanisms over time to protect themselves from various environmental agents, they have not been exposed until recently to synthetic nanoparticles. Therefore the human body's defense mechanisms, such as those associated with the immune and inflammatory systems, may be unprepared to respond effectively to nanoparticles.

Due to their small size (approximately the size of viruses), nanoparticles are easily inhaled or digested and may readily penetrate physiological barriers and travel within the circulatory system, potentially disrupting cellular processes and causing disease. Many nanoparticles travel to the lungs, making lung damage one of the primary concerns for human toxicity. However, nanoparticles also have the potential to damage other organs. While the toxological effects of most nanomaterials are largely unknown, there is mounting evidence that nanoparticle exposure is linked to diseases such as asthma, bronchitis, emphysema, lung cancer, Parkinson's disease, and Alzheimer's disease. Nanoparticles also have been linked to the occurrence of arteriosclerosis, blood clots, arrhythmia, heart disease, and cardiac death.

In a diesel engine, nanoparticles may make up about 20% of the total exhaust mass but may constitute more than about 90% of the total number of particles. Nanoparticles may disperse and accumulate in the environment, leading to environmental damage and health risks. They may be difficult to isolate from the larger environment, in part because conventional filtering techniques typically target larger particles.

Figure 1:
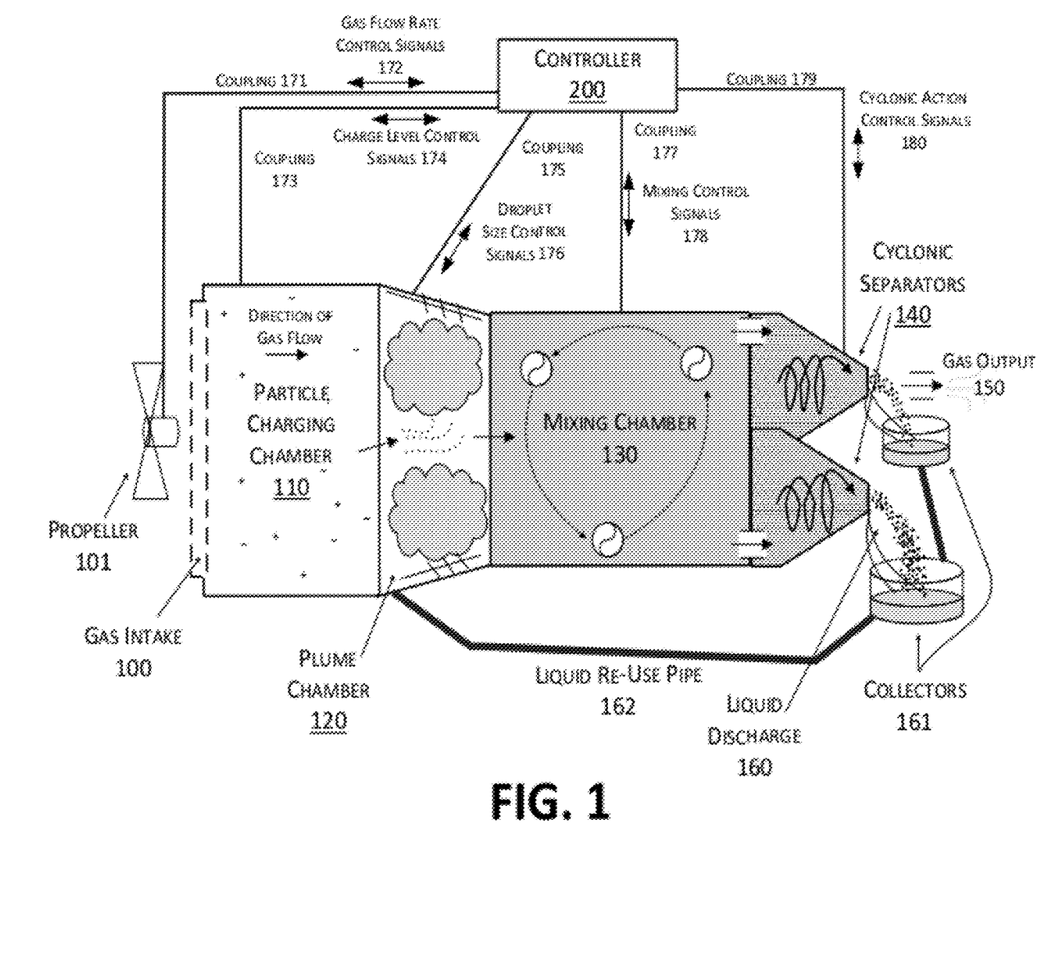
FIG. 1 is a diagram illustrating an example nanoparticle filtration system.

The present disclosure is generally drawn, inter alia, to methods, devices, and/or systems related to filtering nanoparticles from gas. A plume of liquid droplets may be generated and then mixed with the gas and any nanoparticles suspended in the gas, causing the nanoparticles in the gas to adhere to the liquid droplets. The nanoparticles may receive an electric charge prior to being mixed with the liquid droplets, to promote adhesion. The mixed gas may be spun in a cyclonic separator, causing the liquid droplets and adhered nanoparticles to separate from the gas. The filtered gas may be released into the atmosphere and/or used for any desired application, for example by directing the filtered gas for use in a building ventilation system, while the liquid and nanoparticles may be collected, treated, and possibly re-used.

FIG. 1 is a diagram illustrating an example nanoparticle filtration system, arranged in accordance with at least some embodiments of the present disclosure. FIG. 1 comprises a gas intake 100, a particle charging chamber 110, a plume chamber 120, a mixing chamber 130, one or more cyclonic separators 140, a gas output 150, liquid discharge 160, collectors 161, a liquid re-use pipe 162, and controller 200.

In FIG. 1, the gas intake 100, particle charging chamber 110, plume chamber 120, mixing chamber 130 and cyclonic separators 140 may be adjoining elements that are adapted to promote gas flow from an upstream side at the gas intake 100 to a downstream side at a gas output 150 emitted from the cyclonic separators 140. The liquid re-use pipe 162 may be configured to carry liquid from collectors 161 positioned near the cyclonic separators 140 to the plume chamber 120. A propeller 101 may be located at any point in the system and adapted to draw gas through the system. Furthermore, controller 200 may be configured to transmit gas flow rate control signals 172 to propeller 101 via coupling 171. Controller 200 may also be configured to transmit charge level control signals 174 to particle charging chamber 110 via coupling 173. Controller 200 may also be configured to transmit droplet size control signals 176 to plume chamber 120 via coupling 175. Controller 200 may also be configured to transmit mixing control signals 178 to mixing chamber 130 via coupling 177.

Controller 200 may also be configured to transmit cyclonic action control signals 180 to cyclonic separators 140 via coupling 179.

Gas intake 100 may be configured as an entrance to the nanoparticle filtration system. In some embodiments, the gas intake 100 may be configured to receive and channel incoming gas through the system. A variety of configurations are possible with different sizes and shapes of openings or input ports through which the gas may be received. Gas intake 100 may optionally be configured with a screen or preliminary stage filter for preventing objects such as birds, dirt, rain and/or large molecules from entering the system.

Gas intake 100 may comprise a propeller 101 configured to propel the gas through the nanoparticle filtration system in the flow direction. It should be emphasized however that a propeller 101 may be located at any point in the system, and positioning the propeller 101 at the intake 100 is not required. The propeller 101 may be adapted to receive gas flow rate control signals 172 from controller 200 via coupling 171, which may be configured to regulate the flow rate of gas into the filter. For example, a propeller speed may be adjusted in some embodiments to increase or decrease a gas flow rate. A propeller 101 may be configured according to any of a variety of structures for producing air flow in the nanoparticle filtration system. In some embodiments, propeller 101 may comprise one or more spinning fan blades. In some embodiments, propeller 101 may comprise pump or impeller type structures. Where multiple propeller elements are used, flow rate control signals 172 may be optionally configured for selectively enabling or disabling a subset of propeller elements to adjust flow rate.

In some embodiments the gas entering the system at the gas intake 100 may comprise air, such as outside air to be filtered and supplied into a building as part of a building ventilation system. The air or other gas may contain one or more types of nanoparticles, as well as larger particles which may or may not also require filtration. In some embodiments, additional filters (not shown) may be used in conjunction with the disclosed filtration apparatus to remove particles larger than those for which the disclosed filtration apparatus is designed. The nanoparticles may comprise particles approximately 500 nanometers or less in diameter. For example, the nanoparticles may comprise particles emitted from gasoline and diesel engines. Nanoparticles from gasoline engines often range from about 20 to about 60 nanometers in diameter, while nanoparticles from diesel engines often range from about 20 to about 130 nanometers in diameter.

While aspects of the nanoparticle filtration system illustrated in FIG. 1 may be implemented at pressures other than atmospheric pressure, some embodiments of the system may take advantage of the ability of the illustrated system to operate effectively at atmospheric pressures.

The particle charging chamber 110 may be adapted to produce an electrical charge in nanoparticles passing through the particle charging chamber 110, which may result in a greater likelihood of nanoparticle adhesion to liquid droplets in the mixing chamber 130. A particle charging chamber 110 may comprise, for example, a corona discharge element and/or an electron emitter (electron gun). A particle charging chamber 110 is an optional aspect of the illustrated nanoparticle filtration system and may be excluded from some configurations.

A corona discharge element is an element configured to produce corona discharge in the particle charging chamber 110. Corona discharge is a phenomenon in which electrical discharge occurs between conducting surfaces with different voltages. The voltages produce an electric field that ionizes the nanoparticles between the surfaces. The ionization separates one or more free electrons from nanoparticles, thereby producing a positive charge in the remaining nanoparticles.

An electron emitter element is an element configured to emit free electrons into the particle charging chamber 110. For example, a small heater may be used to heat a cathode, which emits a cloud of electrons. Electrodes may then be configured to generate an electric field to direct the electrons into the particle charging chamber 110. Free electrons may attach to certain nanoparticles, resulting in predominantly negatively charged nanoparticles.

Depending on the type of nanoparticle to be filtered, the particle charging chamber 110 may be configured to increase the adhesion of the nanoparticles to the liquid droplets in the mixing chamber 130. For example, gasoline and diesel soot particles may adhere naturally to the surface of water, while other particles may adhere better after being subjected to electrostatic charging in the particle charging chamber 110.

Particle charging chamber 110 may be configured to receive charge level control signals 174 from controller 200 via coupling 173. The charge level control signals 174 may be used to regulate the type and amount of electrostatic charge to be applied, based on the type of nanoparticles being filtered and/or the type of liquid being used in the mixing chamber 130. To control an amount of electrostatic charge in a corona discharge element, the controller 200 may adjust a potential difference across charged surfaces in the corona discharge the element. To control an amount of electrostatic charge in an electron emitter element, the controller 200 may be configured to adjust an intensity level of emitted electrons.

In controlling charge type, an applied electrostatic charge may be predominantly positive or negative, for example by utilizing a selected type of particle charging apparatus in the particle charging chamber 110, such as the corona discharge element versus the electron emitter element described above. Positively charged particles repel each other, as do negatively charged particles, while a positively charged particle and a negatively charged particle attract each other. Therefore charge type may be controlled to promote adhesion of the nanoparticles to liquid droplets.

Figure 4:
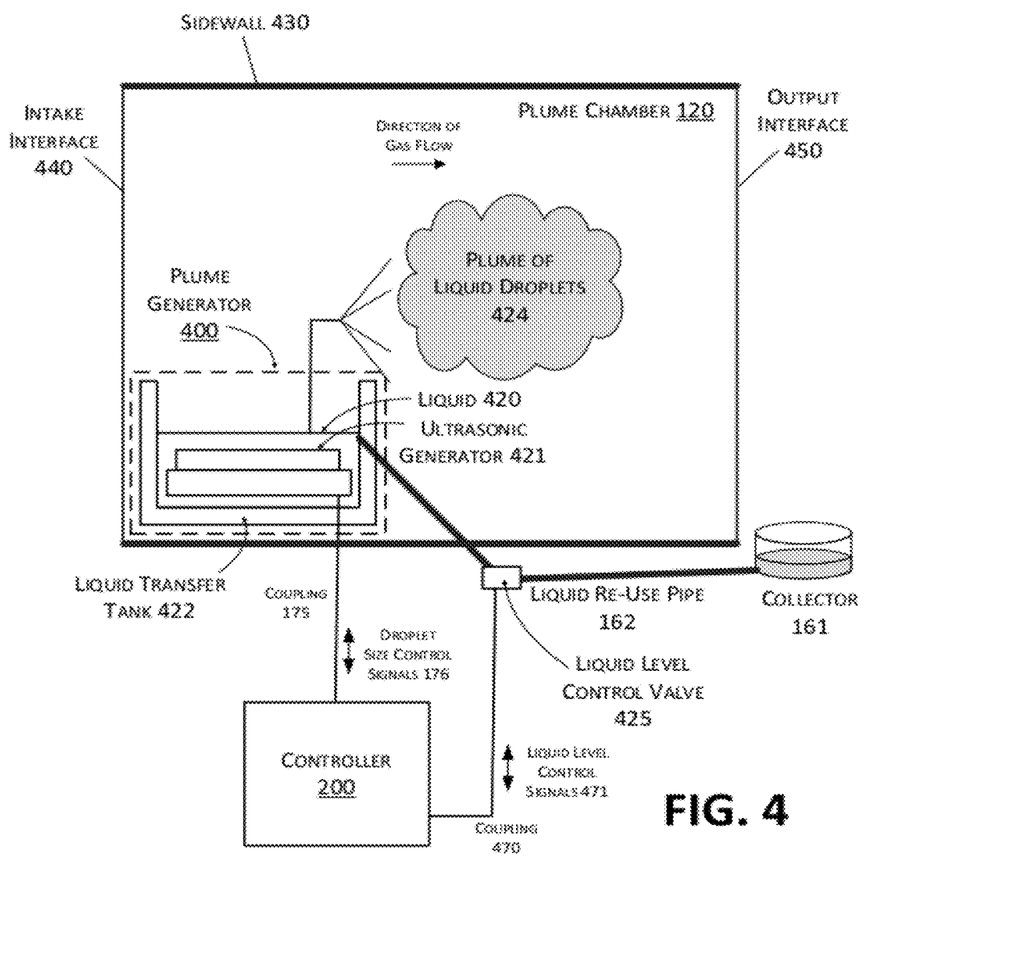
FIG. 4 is a diagram illustrating an example plume chamber adapted for use in a nanoparticle filtration system.

Plume chamber 120 may be configured to produce a plume of liquid droplets suspended in the gas that entered the filter at gas intake 100. FIG. 4 illustrates an example plume chamber 120 in greater detail. In general, the plume chamber 120 may comprise a plume generator that is adapted to produce liquid droplets which become suspended in the gas. The plume generator may be configured to produce the liquid droplets from liquid received via the liquid re-use pipe 162, to recycle liquid used by the system. In other embodiments, a plume generator may be configured to produce the liquid droplets from another supply of liquid such as a building plumbing system coupling, or a liquid intake coupled to a reservoir such as a holding tank, lake, ocean, or river. Some embodiments may be configured without a plume chamber 120 by instead including a plume generator in the gas intake 100 and/or in the mixing chamber 130.

In some embodiments, the liquid droplets produced in the plume chamber 120 may comprise water droplets, although other types of liquids may also be applied, so this disclosure is not limited to water as the working liquid. In some embodiments, small amounts of materials such as dissolved salts and/or residual nanoparticles from previous filtrations carried out by the nanoparticle filtration system may be present in the liquid used in the plume chamber 120, to aid adhesion of the nanoparticles to the liquid droplets.

Mixing chamber 130 may be configured to produce turbulence in the gas flowing through the mixing chamber 130.

Mixing the gas promotes adhesion between suspended nanoparticles and liquid droplets, either through naturally occurring properties of the liquid and nanoparticles, or through prior electrostatic charging. In some embodiments, the mixing chamber 130 may be configured with static turbulence elements such as fins disposed along the sidewalls of the mixing chamber 130. In other embodiments, the mixing chamber 130 may be configured with dynamic turbulence elements that agitate the gas in the mixing chamber 130. For example, fan elements or mechanical stirring elements may serve as dynamic turbulence elements. The mixing chamber 130 may be configured to receive mixing control signals 178 from controller 200 via coupling 177, which may be used to regulate the activation of any dynamic turbulence elements as well as a mixing rate applicable to the gas containing the liquid droplets and nanoparticles.

Many common nanoparticles, such as for example sulfates and organic carbon-based compounds, may be drawn to water and may naturally adhere to water particles. One factor contributing to the adherence of nanoparticles and liquid droplets is the process of Electrostatic Double Layer (EDL) interactions. An EDL is a structure comprising two parallel layers of ions that appears on an object's surface when the object is placed into liquid. The first layer is a positive or negative surface charge, which coincides with the surface of the object. The second layer is a diffuse layer in the fluid, formed from free ions in the fluid under the influence of electric attraction and thermal motion, which electrically screens the first layer. The EDL therefore may behave as a charged surface at close range, attracting additional nanoparticles to adhere to a liquid droplet. To promote nucleation resulting from this phenomenon, liquid used may intentionally include a selected amount of impurities, which may be added to the liquid and/or deliberately left in liquid that already contains certain impurities, to promote adhesion of additional nanoparticles to liquid droplets in the mixing chamber.

The gas may flow from the mixing chamber 130 into cyclonic separators 140. The cyclonic separators 140 may be configured to use rotation and gravity to remove the liquid particles from the gas. An example cyclonic separator 140 is illustrated in detail in FIG. 5. In general, the cyclonic separators 140 may comprise a conical cavity in which the gas flows in a high speed spiral path from the wide end of the cavity to the narrow end. The centrifugal forces push the liquid droplets to the sidewalls of the cyclonic separator, and the gas exits the cyclonic separator as gas output 150, while the liquid along with nanoparticles adhered to the liquid may be emitted as liquid discharge 160. Cyclonic separators 140 may be configured to receive cyclonic action control signals 180 from controller 200 via coupling 179, which may be used to regulate the rate at which the gas rotates within the cyclonic separators 140.

Figure 5:
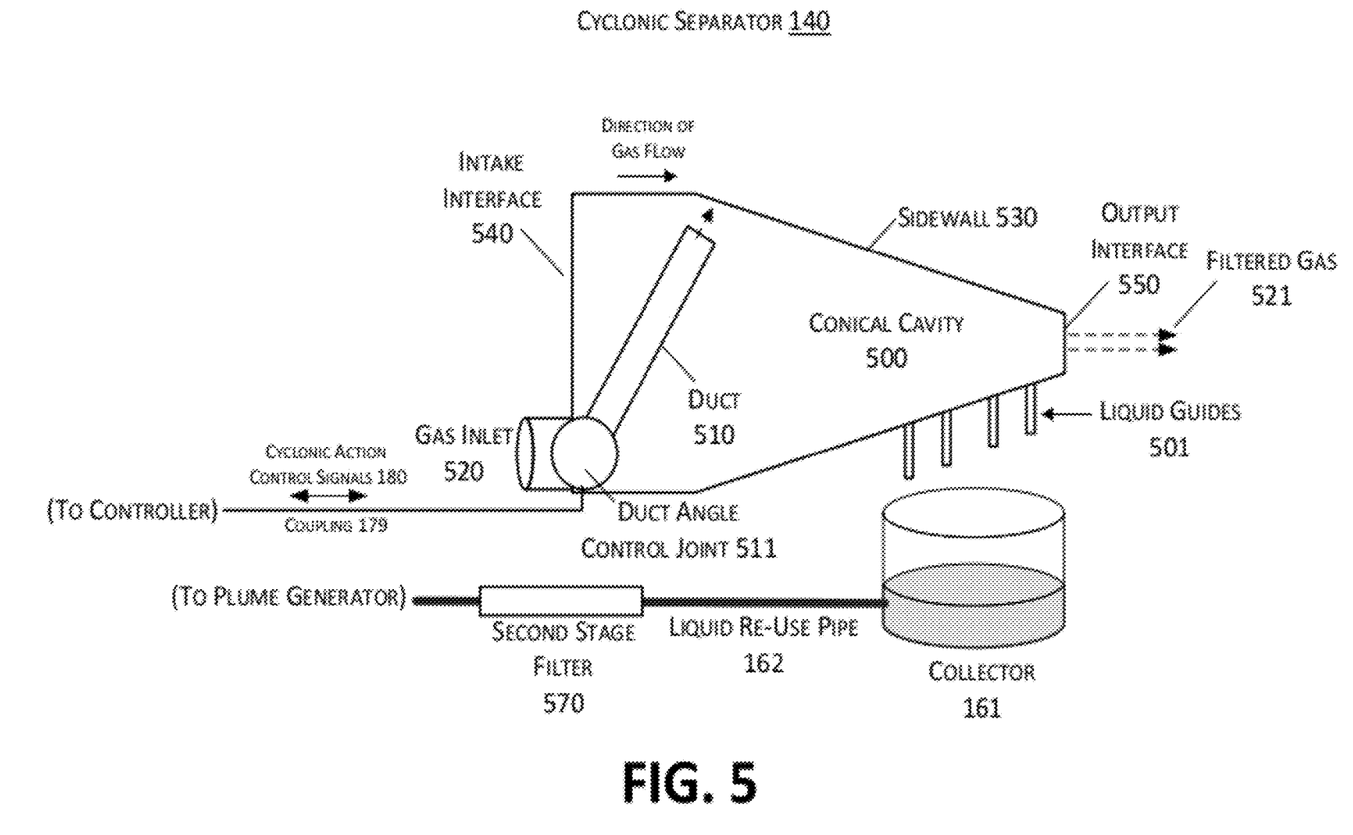
FIG. 5 is a diagram illustrating an example cyclonic separator adapted for use in a nanoparticle filtration system.

In some embodiments, a second stage filter may be configured to separate nanoparticles from the liquid discharge 160. A second stage filter is illustrated in FIG. 5. In some embodiments, the liquid discharge 160 may be adapted to aggregate or settle in the collectors 161 in order to separate the nanoparticles from the liquid discharge 160. A liquid re-use pipe 162 may in some embodiments be configured to carry collected liquid from collectors 161 and/or a second stage filter (not illustrated in FIG. 1) to the plume chamber 120, to supply the liquid for subsequent operation of the plume generator.

Figure 2:
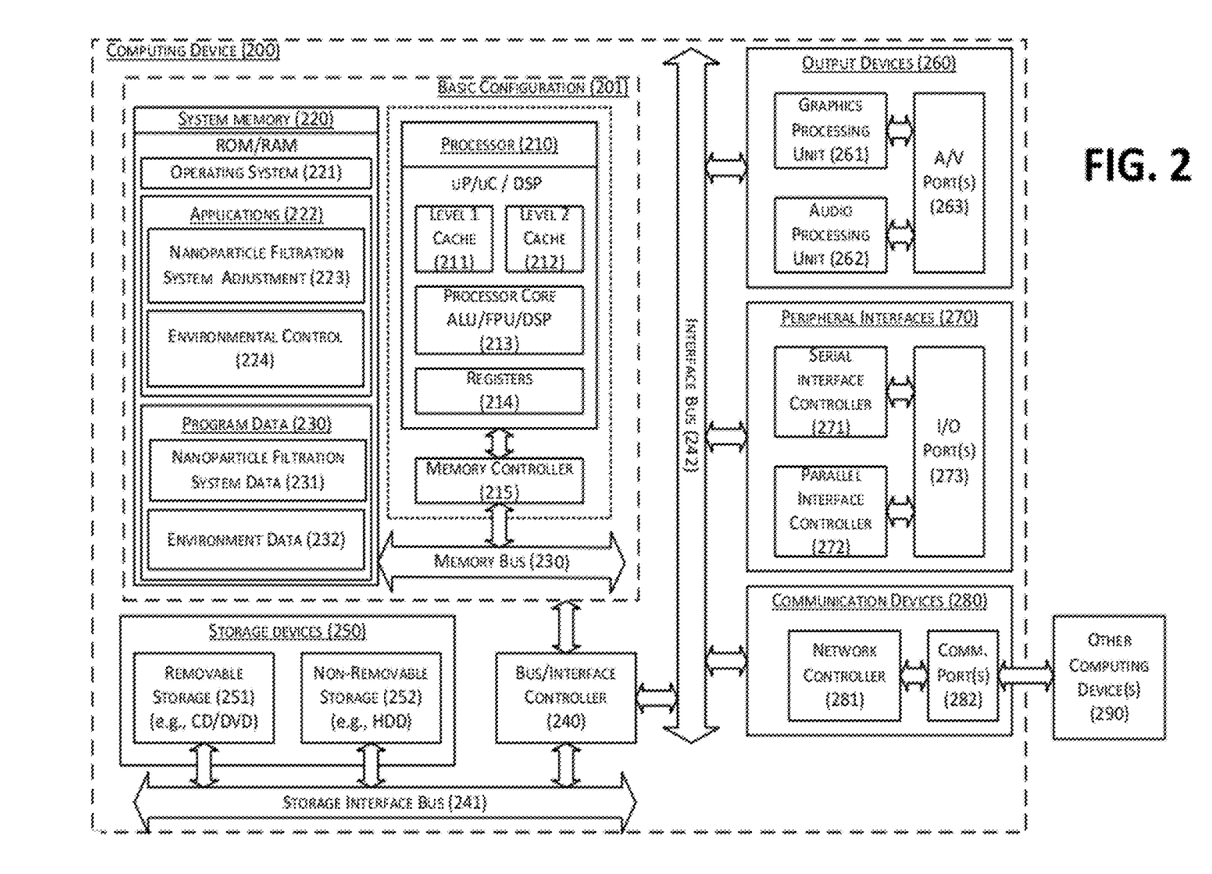
FIG. 2 is a block diagram illustrating a computing device as one example of a controller adapted for use in a nanoparticle filtration system.

FIG. 2 is a block diagram of a computing device 200 adapted for use in a nanoparticle filtration system, arranged in accordance with at least some embodiments of the present disclosure. The computing device 200 is an example of a controller 200 illustrated in FIG. 1. In a very basic configuration 201, computing device 200 may include one or more processors 210 and system memory 220. A memory bus 230 may be used for communicating between the processor 210 and the system memory 220.

Depending on the desired configuration, processor 210 may be of any type including but not limited to a microprocessor (μP), a microcontroller (μC), a digital signal processor (DSP), or any combination thereof. Processor 210 may include one or more levels of caching, such as a level one cache 211 and a level two cache 212, a processor core 213, and registers 214. The processor core 213 may include an arithmetic logic unit (ALU), a floating point unit (FPU), a digital signal processing core (DSP Core), or any combination thereof. A memory controller 215 may also be used with the processor 210, or in some implementations the memory controller 215 may be an internal part of the processor 210.

Depending on the desired configuration, the system memory 220 may be of any type including but not limited to volatile memory (such as RAM), non-volatile memory (such as ROM, flash memory, etc.), or any combination thereof. System memory 220 typically includes an operating system 221, one or more applications 222, and program data 230. Applications 223-224 may include, for example, nanoparticle filtration system adjustment module(s) 223, and environmental control module(s) 224. Program data 231-232 may include, for example, nanoparticle filtration system data 231 and environmental control data 232.

Nanoparticle filtration system adjustment module(s) 223 may comprise, for example, gas flow rate adjustment module(s), droplet size adjustment module(s) (which may also control droplet production rate as described in connection with FIG. 4), charge level adjustment module(s), mixing adjustment module(s), and cyclonic action adjustment module(s), configured to activate and adjust the various aspects of the system illustrated in FIG. 1. Nanoparticle filtration system adjustment module(s) 223 may comprise operational status, maintenance and performance data for the nanoparticle filtration system.

Environmental control module(s) 224 may comprise modules configured as part of a building, boat, airplane, or other controlled environment's environmental control system. The environmental control module(s) 224 may be configured to respond to certain conditions by activating the nanoparticle filtration system. For example, in some embodiments, the computing device may be coupled to sensors measuring indoor and/or outdoor air quality, as well as other data, such as building occupancy. The environmental control module(s) 224 may be configured to activate the nanoparticle filtration system when indoor and/or outdoor air quality falls below a threshold value, or at certain times of day corresponding to high occupancy and/or high expected pollution levels. Environmental control data 232 may comprise the air quality and building occupancy measurements as well as sensor data to track the performance of the nanoparticle filtration system.

Computing device 200 may have additional features or functionality, and additional interfaces to facilitate communications between the basic configuration 201 and any required devices and interfaces. For example, a bus/interface controller 240 may be used to facilitate communications between the basic configuration 201 and one or more data storage devices 250 via a storage interface bus 241. The data storage devices 250 may be removable storage devices 251, non-removable storage devices 252, or a combination thereof. Examples of removable storage and non-removable storage devices include magnetic disk devices such as flexible disk drives and hard-disk drives (HDD), optical disk drives 
such as compact disk (CD) drives or digital versatile disk (DVD) drives, solid state drives (SSD), and tape drives, to name a few. Example computer storage media may include volatile and nonvolatile, removable and non-removable media implemented in any method or technology for storage of information, such as computer readable instructions, data structures, program modules, or other data.

System memory 220, removable storage 251, and non-removable storage 252 are all examples of computer storage media. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium that may be used to store the desired information and that may be accessed by computing device 200. Any such computer storage media may be part of device 200.

Computing device 200 may also include an interface bus 242 for facilitating communication from various interface devices (e.g., output interfaces, peripheral interfaces, and communication interfaces) to the basic configuration 201 via the bus/interface controller 240. Example output devices 260 include a graphics processing unit 261 and an audio processing unit 262, which may be configured to communicate to various external devices such as a display or speakers via one or more A/V ports 263. Example peripheral interfaces 270 may include a serial interface controller 271 or a parallel interface controller 272, which may be configured to communicate through either wired or wireless connections with external devices such as input devices (e.g., keyboard, mouse, pen, voice input device, touch input device, etc.) or other peripheral devices (e.g., printer, scanner, etc.) via one or more I/O ports 273. Other conventional I/O devices may be connected as well such as a mouse, keyboard, and so forth. An example communications device 280 includes a network controller 281, which may be arranged to facilitate communications with one or more other computing devices 290 over a network communication via one or more communication ports 282.

The computer storage media may be one example of a communication media. Communication media may typically be embodied by computer readable instructions, data structures, program modules, or other data in a modulated data signal, such as a carrier wave or other transport mechanism, and include any information delivery media. A "modulated data signal" may be a signal that has one or more of its characteristics set or changed in such a manner as to encode information in the signal. By way of example, and not limitation, communication media may include wired media such as a wired network or direct-wired connection, and wireless media such as acoustic, radio frequency (RF), infrared (IR), and other wireless media.

Computing device 200 may be implemented as a part of a building, boat, airplane, or other environment's environmental control system, such as systems controlling Heating, Ventilation, and Air Conditioning (HVAC) for large buildings. Computing device 200 may also be implemented as a personal computer including both laptop computer and non-laptop computer configurations. Other form factors are also possible as will be appreciated, including small-form factor portable (or mobile) electronic devices, application-specific devices, or any of a variety of hybrid devices that include any of the above functions.

Figure 3:
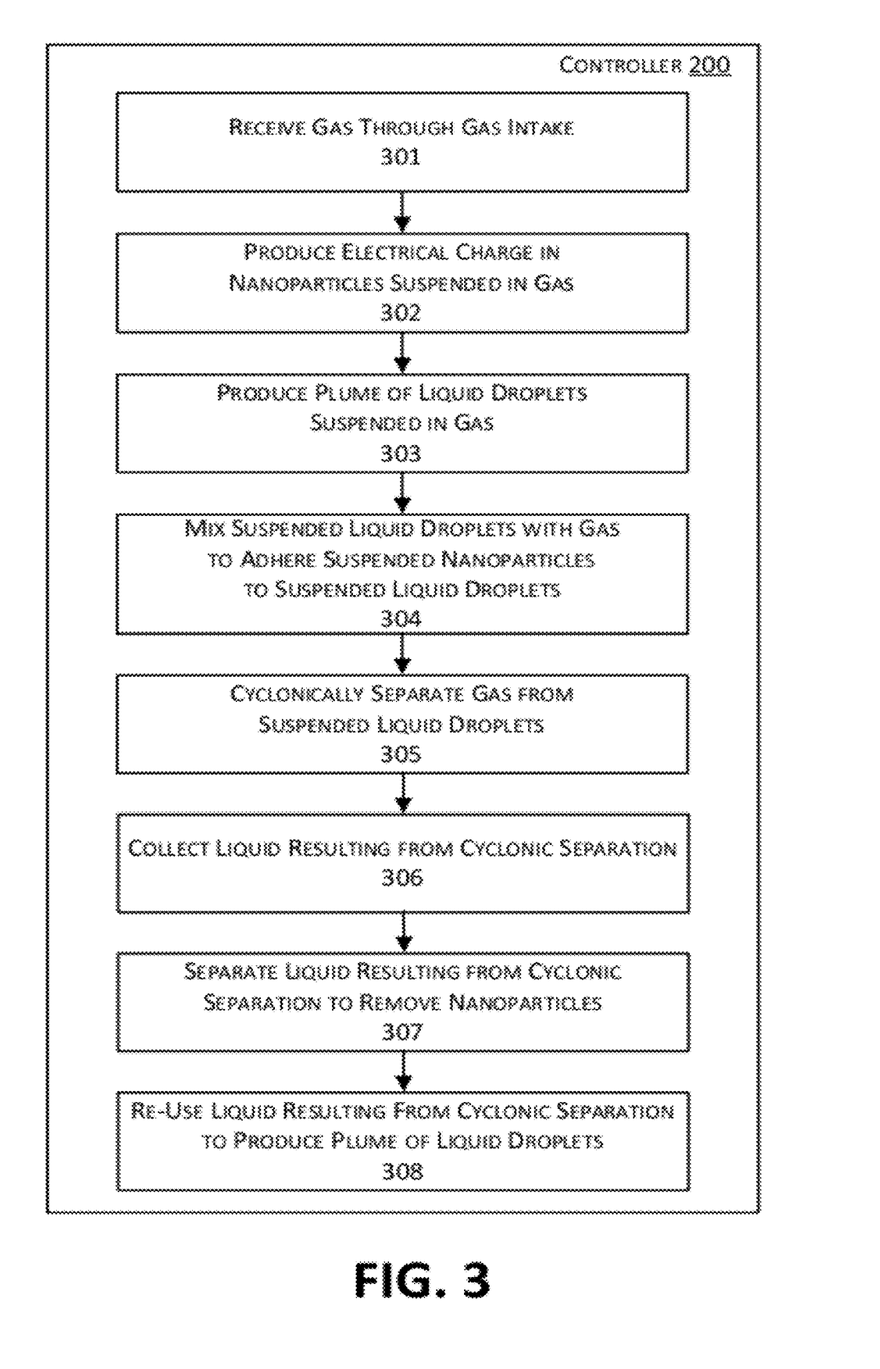
FIG. 3 is a flow diagram illustrating an example method that may be performed in a nanoparticle filtration system.

FIG. 3 is a flow diagram illustrating an example method that may be performed in a nanoparticle filtration system, arranged in accordance with at least some embodiments of the present disclosure. The example flow diagram may include one or more operations/modules as illustrated by blocks 301-308, which represent operations as may be performed in a method, functional modules in a controller 200, and/or instructions as may be recorded on a computer readable medium. The illustrated blocks 301-308 may be arranged to provide functional operations including one or more of "Receive Gas Through Gas Intake" at block 301, "Produce Electrical Charge in Nanoparticles Suspended in Gas" at block 302, "Produce Plume of Liquid Droplets Suspended in Gas" at block 303, "Mix Suspended Liquid Droplets with Gas to Adhere Suspended Nanoparticles to Suspended Liquid Droplets" at block 304, "Cyclonically Separate Gas from Suspended Liquid Droplets" at block 305, "Collect Liquid Resulting from Cyclonic Separation" at block 306, "Separate Liquid Resulting from Cyclonic Separation to Remove Nanoparticles" at block 307, and/or "Re-Use Liquid Resulting from Cyclonic Separation" at block 308.

In FIG. 3, blocks 301-308 are illustrated as being performed sequentially, with block 301 first and block 308 last. It will be appreciated however that these blocks may be re-ordered as convenient to suit particular embodiments, and that these blocks or portions thereof may be performed concurrently in some embodiments. It will also be appreciated that in some examples various blocks may be eliminated, divided into additional blocks, and/or combined with other blocks.

FIG. 3 generally illustrates an example method by which gas containing nanoparticles may flow into a filter through an intake mechanism; the nanoparticles may be electrostatically charged to promote adhesion to larger liquid particles; the gas containing nanoparticles may flow into a chamber containing a plume of liquid droplets, and may be further mixed such that the nanoparticles adhere to the liquid droplets; the gas may be cyclonically separated from the liquid droplets, allowing the cleaned gas to flow out through an output mechanism; and the resulting discharged liquid may be collected, separated from any undesired particles, and re-used. Some or all of the various illustrated blocks may be implemented in part by the controller 200 illustrated in FIG. 2, however it will be appreciated that the method may be performed in some embodiments without participation of a controller 200.

In a "Receive Gas Through Gas Intake" block 301, air or another gas containing nanoparticles may in some embodiments be drawn into a particle charging chamber that may be configured to provide an electrical charge in the nanoparticles suspended in the gas. In other embodiments, the gas intake may draw air or another gas containing nanoparticles into a plume chamber and/or mixing chamber equipped with a plume generator. A propeller may be configured to propel the gas through the nanoparticle filtration system in the flow direction. The propeller may in some embodiments be regulated by a controller that transmits gas flow rate control signals to the propeller to control the speed at which the gas flows through the system. Block 301 may be followed by block 302.

In a "Produce Electrical Charge in Nanoparticles Suspended in Gas" block 302, in embodiments where the gas intake draws gas into a particle charging chamber, the particle charging chamber may be activated to apply an electrostatic charge to nanoparticles suspended in the gas. In embodiments comprising a corona discharge element, voltages may be applied to surfaces of the element to ionize the nanoparticles at a desired level. In embodiments comprising an electron emitter, a cathode may be heated and an electric field may be generated to focus the electrons into the particle charging chamber. The particle charging chamber may in some embodiments receive from a controller charge level control signals that regulate the type and amount of electrostatic charge to be applied, based on the type of nanoparticles being filtered and/or the type of liquid being used in the downstream mixing chamber, as described above. Block 302 may be followed by block 303.

In a "Produce Plume of Liquid Droplets Suspended in Gas" block 303, a plume generator may be activated to produce a plume of liquid droplets suspended in the gas that entered the filter through the gas intake. In some embodiments, the plume generator may be adjusted to generate liquid droplets of a selected size, and may furthermore be adjusted to produce droplets at a selected droplet production rate. The plume generator may receive from a controller droplet size control signals arranging the plume generator to produce optimal average liquid droplet sizes. The controller may monitor humidity and air temperature to determine the optimal droplet size. For example, larger droplets may be generated in hot, dry environments, to allow for evaporation, while smaller droplets may be generated in humid environments, to allow for increase in droplet size as droplets combine with ambient humidity. The liquid droplets may comprise droplets ranging from 1 to 100 microns in diameter. The plume of liquid droplets may in some embodiments be generated by a vibrating element such as an ultrasonic generator submerged in liquid, or by a sprayer element, as described further below. In embodiments where the plume generator is connected to a controller, the controller may determine a rate of vibration and/or sprayer aperture size required to produce liquid droplets of a desired average size. The plume may be mixed with air or another gas so that nanoparticles in the gas may adhere to the surfaces of the liquid droplets. Additional aspects of a plume generator are described below in connection with FIG. 4. Block 303 may be followed by block 304.

In a "Mix Suspended Liquid Droplets with Gas to Adhere Suspended Nanoparticles to Suspended Liquid Droplets" block 304, the gas with suspended nanoparticles and suspended liquid droplets generated in the plume chamber may enter a mixing chamber downstream of the plume generator. The mixing chamber may comprise one or more turbulence elements, such as auxiliary fans or fixed fins, to direct the gas flow and to increase adherence of the suspended nanoparticles to the liquid droplets. The mixing chamber may receive from a controller mixing control signals, which may regulate the circulation rate of the gas with suspended nanoparticles and liquid droplets. Mixing the liquid droplets and the gas may promote adhesion between the suspended nanoparticles and the liquid droplets, either through naturally adherent properties or in some embodiments with the aid of prior electrostatic charging. Block 304 may be followed by block 305.

In a "Cyclonically Separate Gas from Suspended Liquid Droplets" block 305, the gas containing suspended liquid droplets with adhered nanoparticles may flow downstream into a cyclonic separator, comprising a substantially conical cavity that narrows in diameter in the flow direction and is configured to produce cyclonic spinning of the gas. The cyclonic spinning action separates the suspended liquid droplets from the gas, allowing the filtered gas to flow through a gas output while the liquid droplets and adhered nanoparticles are discharged into collectors. In some embodiments, the gas or air in the cyclonic separators may flow through one or more ducts to produce cyclonic spinning of the gas and to direct the gas in a desired spin direction. The cyclonic separators may in some embodiments receive from a controller cyclonic action control signals, which may regulate the rate at which the gas spins inside the cyclonic separators. The cyclonic action control signals also may control the flow of the cleaned and conditioned air or gas through the gas output. Block 305 may be followed by block 306.

In a "Collect Liquid Resulting from Cyclonic Separation" block 306, the cyclonic separators may discharge liquid containing liquid droplets and adhered nanoparticles into collectors, while the filtered air or gas flows out of the gas output. Filtered air may be supplied to an HVAC or other ventilation system for use in ventilating an environment such as a building, boat, or airplane. In some embodiments, liquid may be allowed to aggregate or settle in collectors in order to facilitate the separation of the nanoparticles from the liquid. Block 306 may be followed by block 307.

In a "Separate Liquid Resulting from Cyclonic Separation to Remove Nanoparticles" block 307, a second stage filter may be configured to separate the adhered nanoparticles from the liquid discharge. In some embodiments, the second stage filter may be configured as a settling tank in which particles either settle to the bottom, or rise to the top of the separation tank over time. In some embodiments, the second stage filter may be configured as a chemical and/or mechanical filter. In some embodiments, the second stage filter may be configured to allow a selected amount of adhered nanoparticles to remain in the liquid, to promote adhesion of additional nanoparticles through nucleation and EDL phenomena described above. Block 307 may be followed by block 308.

In a "Re-Use Liquid Resulting from Cyclonic Separation to Produce Plume of Liquid Droplets" block 308, liquid emitted from the cyclonic separators may be supplied to a plume generator for re-use in the nanoparticle filtration system.

The collected liquid may in some embodiments be directed back to the plume generator through a liquid re-use pipe, thereby supplying the necessary liquid to generate a new plume of droplets. In some embodiments, a liquid not suitable for re-use may be discharged as waste, while re-usable liquid may be supplied to the plume generator via the re-use pipe.

FIG. 4 is a diagram illustrating an example plume chamber adapted for use in a nanoparticle filtration system, arranged in accordance with at least some embodiments of the present disclosure. The illustrated plume chamber is an example of a plume chamber 120 in FIG. 1. FIG. 4 comprises a plume chamber 120, a controller 200, and a collector 161. The plume chamber 120 comprises an intake interface 440, sidewalls 430, an output interface 450, and a plume generator 400. Plume generator 400 comprises a liquid transfer tank 422. The liquid transfer tank 422 may comprise liquid 420 and an ultrasonic generator 421, which is adapted to generate a plume of liquid droplets 424 in the plume chamber 120. The collector 161 is coupled to the liquid transfer tank 422 via a liquid re-use pipe 162, along which a liquid level control valve 425 may be disposed.

In FIG. 4, controller 200 is coupled to an ultrasonic generator 421 via coupling 175, over which droplet size control signals 176 may be transmitted. Controller 200 also is coupled to a liquid level control valve 425 via coupling 470, over which liquid level control signals 471 may be transmitted.

The plume chamber 120 may comprise an intake interface 440, sidewalls 430, an output interface 450, and a plume generator 400. In some embodiments, aspects of the plume chamber 120 may be excluded by placing a plume generator 400 in another location in the nanoparticle filtration system, such as in the mixing chamber 130 or in the gas intake 100. Therefore, properties described herein with reference to the plume chamber 120 may be applicable to other aspects of the system as appropriate.

Intake interface 440 may be configured to couple with an upstream element such as a gas intake 100 or particle charging chamber 110. The intake interface 440 may be configured to direct a flow of gas containing suspended nanoparticles into the plume chamber 120. The gas and plume 424 may be held in the plume chamber by sidewalls 430. The output interface 450 may be configured to couple with a downstream element such as a mixing chamber 130 or cyclonic separator 140. The output interface 450 may be configured to direct a flow of gas containing suspended nanoparticles into the downstream element, for example, the output interface 450 may be designed to channel the gas a particular position and direction to accommodate the mixing chamber 130 and/or cyclonic separator 140.

The plume generator 400 may comprise a liquid transfer tank 422 and an ultrasonic generator 421. The liquid transfer tank 422 may comprise sidewalls configured to contain a quantity of liquid 420. The ultrasonic generator 421 may be disposed in contact with the liquid 420, such as by aligning a flat surface of the ultrasonic generator 421 facing upward below a layer of liquid 420 as illustrated in FIG. 4, such that vibration of the ultrasonic generator 421 produces a plume of airborne liquid droplets 424. Drops 424 are projected by vibration of the ultrasonic generator 421, up out of the liquid 420, while new liquid 420 flows onto the ultrasonic generator 421 from the sides of the ultrasonic generator 421. In some embodiments, the layer of liquid 420 above the surface of the ultrasonic generator 421 may be maintained at a level about 0.1 to about 3.0 millimeters thick.

An ultrasonic generator 421 may be configured to generate the plume 424 with high energy efficiency. In some embodiments, the ultrasonic generator 421 may comprise a piezoelectric disk. An alternating electric field can be applied to the piezoelectric such that the disk deforms and produces vibrations at desired frequencies. A piezoelectric disk may for example comprise a thin disk of brass bonded to a layer of a ceramic-like material exhibiting piezoelectric properties. Applying an alternating electric field to the brass disk causes the ceramic material to deform, flexing the piezoelectric disk.

In some embodiments, a plume generator 400 configured substantially as illustrated in FIG. 4 may be configured with another vibration-type droplet generating mechanism, such as a voice coil. A voice coil may comprise a structure similar to that traditionally used for audio speakers, in which alternating current applied to a wire coil disposed in a magnetic field produces a desired vibration frequency in a diaphragm that is in mechanical contact with the wire coil. Other mechanisms for producing high-frequency vibrations to generate a plume of water droplets are also feasible, this disclosure is not limited to any particular vibrating element structure.

In some embodiments, a plume generator 400 may comprise other mechanisms for generating a plume of liquid droplets 424. For example, a sprayer may be used in some embodiments. A sprayer may be configured with one or more apertures of selected aperture size. Liquid forced through the apertures may spray a plume of liquid droplets into the plume chamber 120. Aperture size and shape and liquid backpressures may affect the properties of liquid droplets produced in a sprayer plume. In some embodiments, both aperture size and liquid backpressures may be adjustable, to allow for droplet size adjustment and/or adjustment of a rate of droplet production.

The ultrasonic generator 421 may be configured for activation via the controller 200. In some embodiments, the controller 200 may activate and deactivate the ultrasonic generator 421, e.g., at a same time as a propeller and any other electronically controlled aspects of the system are activated to initiate and cease operation of the filtration system.

In some embodiments, the ultrasonic generator 421 may furthermore be configured to respond to droplet size control signals 176 from controller 200 received via coupling 175 by producing droplets of a size determined in the controller 200, and may furthermore produce droplets at a rate determined in the controller 200. The liquid droplets may for example comprise droplets ranging from 1 to 100 microns in diameter. Humidity and air temperature may be used in the controller 200 to determine optimal droplet size. Droplets generally evaporate more quickly in hot, dry environments, and larger size particles may be preferable. In humid environments, the droplets may collect additional liquid, and so smaller size particles may be preferable. Air output requirements for the nanoparticle filtration system may be used to determine a rate droplet production to be implemented at the plume generator 400, with larger, more rapid air outputs generally corresponding to faster rates of droplet production, as well as faster propeller speeds.

Controller 200 may in some embodiments be configured to transmit liquid level control signals 471 to a liquid level control valve 425, controlling the flow of liquid through a liquid re-use pipe 162 or other liquid source into the liquid transfer tank 422, to maintain sufficient liquid in the tank 422 such that the plume generator 400 may operate continuously. Liquid 420 may for example flow into the tank 422 at a liquid inlet in the tank 422 where the liquid re-use pipe 162 meets the tank 422. Controller 200 may be configured to shut off the valve 425 when the plume generator 400 is shut off, to prevent overflow of the tank 422.

FIG. 5 is a diagram illustrating an example cyclonic separator adapted for use in a nanoparticle filtration system, arranged in accordance with at least some embodiments of the present disclosure. The illustrated cyclonic separator is an example of a cyclonic separator 140 in FIG. 1. FIG. 5 comprises an intake interface 540 a gas inlet 521, a duct 510, a duct angle control joint 511, sidewalls 530 defining a conical cavity 500, an output interface 550 through which filtered gas 521 may exit, and liquid guides 501 through which liquid may be discharged. Liquid may be discharged from the cyclonic separator into a collector 161 and may travel through a liquid re-use pipe 162 and in some embodiments through a second stage filter 570 to the plume generator.

In FIG. 5, a controller is coupled to the duct angle control joint 511 via a coupling 179, over which cyclonic action control signals 180 may be transmitted.

Intake interface 540 may be configured to couple with an upstream element such as a mixing chamber 130. The intake interface 540 may be comprise a gas inlet 541 configured to direct a flow of gas containing suspended liquid droplets adhered to nanoparticles into the duct 510. The duct 510 may direct the gas in a desired spin direction to initiate cyclonic spinning A controller 200 may transmit cyclonic action control signals 180 to the duct angle control joint 511, which may change the angle of the duct 510 and thereby increase or decrease the rate of cyclonic spinning.

As the gas flows into the conical cavity 500 in a cyclonic motion, the liquid droplets and adhered nanoparticles may collect along sidewalls of the cavity 500, and the liquid guides 501 may discharge them into a collector 161. Large particles such as liquid droplets have too much inertia to follow the spiral flow of the cyclonic motion, and therefore spin to the sidewalls of the cavity 500. The rotation of the gas in the cyclonic motion gets smaller and smaller as it approaches the narrow end of the cavity 500, which may allow some smaller particles to be removed.

In some embodiments, a final stage of the cyclonic separator 140 may comprise a cone with sheets of collected liquid that wash the liquid discharge 160, containing adhered nanoparticles and liquid droplets, into collectors 161 while the cleaned and conditioned air or gas flows out of the gas output 150. Furthermore, in some embodiments, a cyclonic separator 140 may be configured such that filtered gas 521 exits the cavity 500 by flowing back through the center of the cavity 500, and out the top of the cavity 500.

The filtered gas 521 may exit the cyclonic separator 140 through the output interface 550. The output interface 550 may be configured to couple to a pipe or duct for transmitting the filtered gas 521 to desired locations, such as through a building ventilation system. Meanwhile, the collected liquid may pass through a liquid re-use pipe 162 and in some embodiments pass through a second stage filter 570, where a selected amount of the nanoparticles may be removed from the collected liquid before the liquid is again piped to the plume generator.

Figure 6:
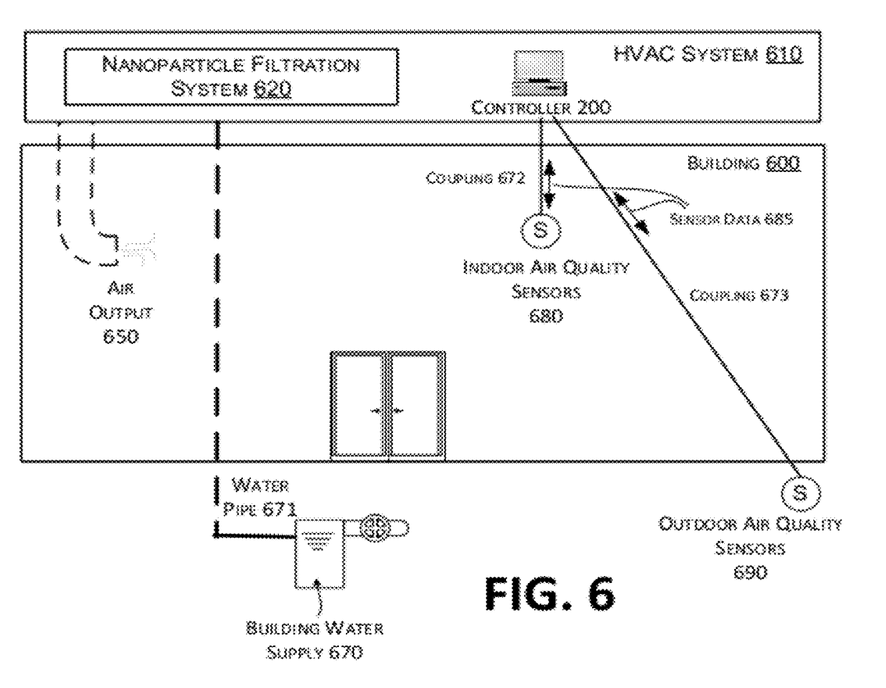
FIG. 6 is a diagram illustrating an example building ventilation system incorporating a nanoparticle filtration system; all arranged in accordance with at least some embodiments of the present disclosure.

FIG. 6 is a diagram illustrating an example building ventilation system incorporating a nanoparticle filtration system, arranged in accordance with at least some embodiments of the present disclosure. FIG. 6 comprises a building 600, HVAC system 610, building water supply 670, and indoor and outdoor air quality sensors 680 and 690. HVAC system 610 comprises a nanoparticle filtration system 620 and controller 200.

In FIG. 6, controller 200 is coupled to the indoor and outdoor air quality sensors 680 and 690 via couplings 672 and 673, respectively, over which sensor data 685 may be communicated. Also, HVAC system 610 may be configured to emit an air output 650 into building 600. Furthermore, the building water supply 670 may be coupled to the HVAC system 610 via water pipe 671.

The nanoparticle filtration system 620 may be integrated with an HVAC system 610. For example, an HVAC system 610 may use a nanoparticle filtration system 620 as described herein to filter air as it is re-circulated within a building 600, or as the air is brought in from outdoors. The HVAC system 610 may be adapted to activate and/or deactivate the nanoparticle filtration system 620 as necessary to provide nanoparticle filtration.

An HVAC system 610 may be configured to operate under the control of a building environmental control system, which may be implemented in a controller 200 along with controls for the nanoparticle filtration system 620. Environmental control systems may be coupled to thermostats and occupancy sensors to provide real-time data for adaptive operation of the HVAC system 610. In accordance with some embodiments of this disclosure, an environmental control system implemented in controller 200 may be adapted to monitor sensor data 685 from indoor and/or outdoor air quality sensors 680 and 690, and may be adapted to control a nanoparticle filtration system 620 responsive to the received sensor data 685. For example, an environmental control system may be configured to activate the nanoparticle filtration system 620 when indoor and/or outdoor air quality drops below a predetermined threshold level.

There is little distinction left between hardware and software implementations of aspects of systems; the use of hardware or software is generally (but not always, in that in certain contexts the choice between hardware and software may become significant) a design choice representing cost vs. efficiency tradeoffs. There are various vehicles by which processes and/or systems and/or other technologies described herein may be effected (e.g., hardware, software, and/or firmware), and that the preferred vehicle will vary with the context in which the processes and/or systems and/or other technologies are deployed. For example, if an implementer determines that speed and accuracy are paramount, the implementer may opt for a mainly hardware and/or firmware vehicle; if flexibility is paramount, the implementer may opt for a mainly software implementation; or, yet again alternatively, the implementer may opt for some combination of hardware, software, and/or firmware.

The foregoing detailed description has set forth various embodiments of the devices and/or processes via the use of block diagrams, flowcharts, and/or examples. Insofar as such block diagrams, flowcharts, and/or examples contain one or more functions and/or operations, it will be understood by those within the art that each function and/or operation within such block diagrams, flowcharts, or examples may be implemented, individually and/or collectively, by a wide range of hardware, software, firmware, or virtually any combination thereof. In one embodiment, several portions of the subject matter described herein may be implemented via Application Specific Integrated Circuits (ASICs), Field Programmable Gate Arrays (FPGAs), digital signal processors (DSPs), or other integrated formats. However, those skilled in the art will recognize that some aspects of the embodiments disclosed herein, in whole or in part, may be equivalently implemented in integrated circuits, as one or more computer programs running on one or more computers (e.g., as one or more programs running on one or more computer systems), as one or more programs running on one or more processors (e.g., as one or more programs running on one or more microprocessors), as firmware, or as virtually any combination thereof, and that designing the circuitry and/or writing the code for the software and or firmware would be well within the skill of one of skill in the art in light of this disclosure. In addition, those skilled in the art will appreciate that the mechanisms of the subject matter described herein are capable of being distributed as a program product in a variety of forms, and that an illustrative embodiment of the subject matter described herein applies regardless of the particular type of signal bearing medium used to actually carry out the distribution. Examples of a signal bearing medium include, but are not limited to, the following: a recordable type medium such as a floppy disk, a hard disk drive, a Compact Disc (CD), a Digital Video Disk (DVD), a digital tape, a computer memory, etc.; and a transmission type medium such as a digital and/or an analog communication medium (e.g., a fiber optic cable, a waveguide, a wired communications link, a wireless communication link, etc.).

Those skilled in the art will recognize that it is common within the art to describe devices and/or processes in the fashion set forth herein, and thereafter use engineering practices to integrate such described devices and/or processes into data processing systems. That is, at least a portion of the devices and/or processes described herein may be integrated into a data processing system via a reasonable amount of experimentation. Those having skill in the art will recognize that a typical data processing system generally includes one or more of a system unit housing, a video display device, a memory such as volatile and non-volatile memory, processors such as microprocessors and digital signal processors, computational entities such as operating systems, drivers, graphical user interfaces, and applications programs, one or more interaction devices, such as a touch pad or screen, and/or control systems including feedback loops and control motors (e.g., feedback for sensing position and/or velocity; control motors for moving and/or adjusting components and/ or quantities). A typical data processing system may be implemented utilizing any suitable commercially available components, such as those typically found in data computing/ communication and/or network computing/communication systems. The herein described subject matter sometimes illustrates different components contained within, or connected with, different other components. It is to be understood that such depicted architectures are merely examples, and that in fact many other architectures may be implemented which achieve the same functionality. In a conceptual sense, any arrangement of components to achieve the same functionality is effectively "associated" such that the desired functionality is achieved. Hence, any two components herein combined to achieve a particular functionality may be seen as "associated with" each other such that the desired functionality is achieved, irrespective of architectures or intermediate components. Likewise, any two components so associated may also be viewed as being "operably connected", or "operably coupled", to each other to achieve the desired functionality, and any two components capable of being so associated may also be viewed as being "operably couplable", to each other to achieve the desired functionality. Specific examples of operably couplable include but are not limited to physically connectable and/or physically interacting components and/or wirelessly interactable and/or wirelessly interacting components and/or logically interacting and/or logically interactable components.

With respect to the use of substantially any plural and/or singular terms herein, those having skill in the art may translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to inventions containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

While certain example techniques have been described and shown herein using various methods, devices and systems, it should be understood by those skilled in the art that various other modifications may be made, and equivalents may be substituted, without departing from claimed subject matter. Additionally, many modifications may be made to adapt a particular situation to the teachings of claimed subject matter without departing from the central concept described herein. Therefore, it is intended that claimed subject matter not be limited to the particular examples disclosed, but that such claimed subject matter also may include all implementations falling within the scope of the appended claims, and equivalents thereof.

The invention claimed is:

1. A filter apparatus configured to process a gas including nanoparticles suspended therein, the filter apparatus having a gas intake and a gas output, and a flow direction extending from the gas intake to the gas output, the filter apparatus comprising:

a piezoelectric ultrasonic plume generator that is positioned downstream of the gas intake in the flow direction, wherein the plume generator is adapted to receive the gas via the gas intake and configured to produce a plume of liquid droplets suspended in the received gas;

a mixing chamber that is positioned downstream of the plume generator in the flow direction, wherein the mixing chamber is configured to receive and mix the plume of liquid droplets suspended in the received gas and the nanoparticles suspended therein to generate a mixture, wherein the mixture comprises gas and nanoparticles that are adhesively bonded to the suspended liquid droplets;

a cyclonic separator that is positioned downstream of the mixing chamber, the cyclonic separator comprising a substantially conical cavity narrowing in diameter in the flow direction, and configured to produce cyclonic spinning of the gas to separate the suspended liquid droplets from the gas and to emit the separated gas to the gas output;

wherein the filter apparatus is further configured to re-use, in the plume generator, liquid collected from the cyclonic separator; and a second stage filter configured to remove nanoparticles from liquid collected from the cyclonic separator, wherein the second stage filter is configured to allow a selected amount of nanoparticles to remain in the collected liquid to be re-used in the plume generator, to promote adhesion between liquid droplets and nanoparticles in the mixing chamber.

2. The filter apparatus of claim 1, further comprising a particle charging chamber that is positioned upstream of the plume generator, wherein the particle charging chamber is configured to apply an electrical charge to nanoparticles suspended in the gas.

3. The filter apparatus of claim 2, the particle charging chamber comprising either a corona discharge element or an electron emitter.

4. The filter apparatus of claim 1, further comprising a collector configured to collect liquid from the cyclonic separator.

5. The filter apparatus of claim 1, further comprising a propeller configured to propel the gas through the filter in the flow direction.

6. The filter apparatus of claim 1, further comprising a controller configured to adjust one or more of a flow rate of the gas through the filter apparatus, a size of the liquid droplets produced by the plume generator, and/or voltage levels in a particle charging chamber configured to produce an electrical charge in the nanoparticles suspended in the gas.

7. The filter apparatus of claim 1, wherein the plume generator is adjustable to generate water particles of a selected size.

8. The filter apparatus of claim 1, wherein the cyclonic separator produces cyclonic spinning of the gas using a duct for directing the gas in a desired spin direction.

9. The filter apparatus of claim 1, wherein the gas comprises air.

10. The filter apparatus of claim 1, wherein the liquid droplets comprise one or more of water droplets and/or droplets with a diameter in a range of about 1 micron to about 100 microns.

11. The filter apparatus of claim 1, wherein the nanoparticles comprise one or more of particles emitted from gasoline engines, particles emitted from diesel engines, and/or particles with a diameter in a range of about 1 nanometer to about 500 nanometers.

12. The filter apparatus of claim 1, wherein the filter apparatus is configured as part of a building ventilation system.

13. A building ventilation system configured to process a gas including nanoparticles suspended therein, the building ventilation system having a gas intake and a gas output, and a flow direction extending from the gas intake to the gas output, the building ventilation system comprising:
 a filter apparatus configured to process air including nanoparticles suspended therein, the filter apparatus comprising an air intake and an air output, and a flow direction extending from the air intake to the air output, the filter apparatus comprising:
  a piezoelectric ultrasonic plume generator that is positioned downstream of the air intake in the flow direction, wherein the plume generator is adapted to receive the gas via the gas intake and configured to produce a plume of liquid droplets suspended in the received air;
  a mixing chamber that is positioned downstream of the plume generator in the flow direction, wherein the mixing chamber is configured to receive and mix the plume of liquid droplets suspended in the received air and the nanoparticles suspended therein to generate a mixture, wherein the mixture comprises gas and nanoparticles that are adhesively bonded to the suspended liquid droplets;
  a cyclonic separator that is positioned downstream of the mixing chamber, the cyclonic separator comprising a substantially conical cavity narrowing in diameter in the flow direction, and configured to produce cyclonic spinning of the air to separate the suspended liquid droplets from the air and to emit the separated air to the air output;
  a propeller configured to propel the air through the filter apparatus in the flow direction;
  wherein the filter apparatus is further configured to re-use, in the plume generator, liquid collected from the cyclonic separator; and
  a second stage filter configured to remove nanoparticles from liquid collected from the cyclonic separator, wherein the second stage filter is configured to allow a selected amount of nanoparticles to remain in the collected liquid to be re-used in the plume generator, to promote adhesion between liquid droplets and nanoparticles in the mixing chamber.

14. The building ventilation system of claim 13, further comprising a collector configured to collect liquid from the cyclonic separator.

15. The building ventilation system of claim 13, wherein the liquid droplets comprise one or more of water droplets and/or droplets with a diameter in a range of about 1 micron to about 100 microns.

16. A method for separating nanoparticles from a gas, comprising:
 receiving the gas via a gas intake;
 producing a plume of liquid droplets suspended in the received gas with a piezoelectric ultrasonic plume generator;
 mixing the plume of liquid droplets suspended in the received gas and nanoparticles suspended therein to generate a mixture, wherein the mixture comprises gas and nanoparticles that are adhesively bonded to the suspended liquid droplets;
 cyclonically separating the gas from the suspended liquid droplets;
 re-using, in the plume generator, liquid from the cyclonic separator; and
 removing nanoparticles from liquid collected from the cyclonic separator, while allowing a selected amount of nanoparticles to remain in the collected liquid to be re-used in the plume generator, to promote adhesion between liquid droplets and nanoparticles in the mixing chamber.

17. The method of claim 16, further comprising applying an electrical charge to nanoparticles in the gas prior to mixing the plume of liquid droplets with the gas.

18. The method of claim 16, further comprising collecting liquid that is cyclonically separated from the gas in a collector.

19. The method of claim 16, wherein removing nanoparticles from liquid collected from the cyclonic separator comprises filtering the collected liquid in a second stage filter to remove nanoparticles from the collected liquid.

20. The method of claim 16, further comprising propelling the gas through a filter apparatus configured to perform the producing a plume, mixing, and cyclonically separating.

21. The method of claim 16, further comprising adjusting one or more of a flow speed of the gas through a filter, a size of the liquid droplets, and/or a voltage level in a particle charging chamber configured to produce an electrical charge in nanoparticles suspended in the gas.

22. The method of claim 16, wherein the gas comprises air.

23. The method of claim 16, wherein the liquid droplets comprise one or more of water droplets and/or droplets with a diameter in a range of about 1 micron to about 100microns.

24. The method of claim 16, wherein the nanoparticles comprise one or more of particles emitted from gasoline engines, particles emitted from diesel engines, and/or particles with a diameter in a range of about 1 nanometer to about 500 nanometers.

25. The method of claim 16, wherein the method is performed as part of a building ventilation process.

* * * * *